United States Patent
Brown et al.

(10) Patent No.: US 7,928,989 B1
(45) Date of Patent: Apr. 19, 2011

(54) FEEDBACK AND RECORD OF TRANSFORMED VERTICES IN A GRAPHICS LIBRARY

(75) Inventors: Patrick R. Brown, Raleigh, NC (US); Eric S. Werness, San Jose, CA (US); Barthold B. Lichtenbelt, Fort Collins, CO (US); Nicholas B. Carter, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 1086 days.

(21) Appl. No.: 11/609,763

(22) Filed: Dec. 12, 2006

Related U.S. Application Data

(60) Provisional application No. 60/833,978, filed on Jul. 28, 2006.

(51) Int. Cl.
*G06F 12/02* (2006.01)
*G06F 15/00* (2006.01)
*G06T 1/00* (2006.01)
*G06T 1/20* (2006.01)

(52) U.S. Cl. .......... 345/543; 345/501; 345/506

(58) Field of Classification Search .......... 345/501, 345/506, 541, 542, 543, 557
See application file for complete search history.

(56) References Cited

U.S. PATENT DOCUMENTS

| | | | |
|---|---|---|---|
| 5,005,137 A | 4/1991 | Ernst | |
| 5,812,854 A | 9/1998 | Steinmetz et al. | |
| 5,821,940 A * | 10/1998 | Morgan et al. | 345/420 |
| 5,870,097 A | 2/1999 | Snyder et al. | |
| 5,977,977 A | 11/1999 | Kajiya et al. | |
| 6,044,225 A | 3/2000 | Spencer et al. | |
| 6,337,689 B1 * | 1/2002 | Hochmuth et al. | 345/522 |
| 6,690,380 B1 * | 2/2004 | Hussain et al. | 345/557 |
| 6,891,544 B2 | 5/2005 | Oka et al. | |
| 6,982,718 B2 | 1/2006 | Kilgard et al. | |
| 6,983,456 B2 | 1/2006 | Poznanovic et al. | |
| 7,006,101 B1 | 2/2006 | Brown et al. | |
| 7,009,615 B1 | 3/2006 | Kilgard et al. | |
| 7,015,915 B1 | 3/2006 | Diard | |
| 7,190,362 B1 * | 3/2007 | Baker et al. | 345/419 |
| 7,570,267 B2 * | 8/2009 | Patel et al. | 345/522 |
| 7,593,010 B2 * | 9/2009 | Wang et al. | 345/421 |
| 2001/0019331 A1 * | 9/2001 | Nielsen et al. | 345/542 |

(Continued)

OTHER PUBLICATIONS

Office Action. U.S. Appl. No. 11/565,566 dated Jun. 9, 2009.

*Primary Examiner* — Kee M Tung
*Assistant Examiner* — Jacinta Crawford
(74) *Attorney, Agent, or Firm* — Patterson & Sheridan, LLP

(57) ABSTRACT

One embodiment of the invention is a method for storing transformed vertex attributes that includes the steps of allocating memory space for a transform feedback buffer, selecting one or more transformed vertex attributes to store in the transform feedback buffer independently of any shader programs executing on any processing units in the graphics rendering pipeline, configuring the transform feedback buffer to store the one or more transformed vertex attributes, and initiating a processing mode wherein vertex data is processed in the graphics rendering pipeline to produce the transformed vertices, the attributes of which are then written to the transform feedback buffer. One advantage is that the transform feedback buffer can be used to store and access transformed vertices, without having to convert the vertex data to a pixel format, store the pixels in a frame buffer, and then convert the pixels back to a vertex format.

23 Claims, 6 Drawing Sheets

U.S. PATENT DOCUMENTS

| | | |
|---|---|---|
| 2003/0020741 A1 | 1/2003 | Boland et al. |
| 2003/0095137 A1* | 5/2003 | Lu et al. .................. 345/660 |
| 2004/0012596 A1 | 1/2004 | Allen et al. |
| 2004/0158693 A1 | 8/2004 | Dagan et al. |
| 2004/0169671 A1 | 9/2004 | Aronson et al. |
| 2005/0243094 A1 | 11/2005 | Patel et al. |
| 2006/0109266 A1* | 5/2006 | Itkowitz et al. ............ 345/419 |
| 2006/0114260 A1 | 6/2006 | Diard |

* cited by examiner

FEEDBACK AND RECORD OF TRANSFORMED VERTICES IN A GRAPHICS LIBRARY

CROSS REFERENCE TO RELATED APPLICATIONS

This application claims priority to the U.S. Provisional Application titled: "API Extensions for Advanced Graphics Processing Units," filed on Jul. 28, 2006 and having U.S. patent application No. 60/833,978.

BACKGROUND OF THE INVENTION

1. Field of the Invention

Embodiments of the present invention generally relate to computer programming using graphics hardware. More specifically, embodiments of the invention relate to techniques for feeding back and recording transformed vertices in a graphics library.

2. Description of the Related Art

Graphics processing units (GPUs) are configured to execute instructions that generate images that may then be displayed on a display device. GPUs typically implement a pipelined architecture, and the different processing units within the pipeline execute shader language programs on the streams of graphics data as that data passes through the different parts of the graphics pipeline. For example, common shader language programs include vertex and fragment programs, and new geometry programs have been added recently. The vertex processing unit executes a vertex shader program on data passing through the vertex shader portion of the graphics pipeline, the geometry processing unit executes a geometry shader program on data passing through the geometry shader portion of the graphics pipeline, and the fragment processing unit executes a fragment shader program on data passing through the fragment shader portion of the graphics pipeline. Generally, the output of the vertex shader is the input to the geometry shader, and the output of the geometry shader is the input to the fragment shader.

Over the past decade, the cost of adding on-chip logic to processors has substantially decreased. Consequently, certain types of processors, such as advanced graphics processing units (GPUs), now include functionality not previously available in earlier GPU designs. For example, the newest CPUs are now able to perform geometry processing operations; whereas, such operations traditionally had been left to the central processing unit (CPU).

Given the increased computing power available on advanced CPUs, graphics developers are using the graphics pipeline for more than just generating images for display on a display screen. For example, a vertex shader program operating on a set of input vertices may take each vertex, process it, and output a transformed set of vertices. Such a shader program could perform physics calculations to determine positions for a set of vertices at an initial point in time and output a subsequent position for each vertex at a second point in time. Another example is in the field of molecular modeling. In such cases, a shader program may calculate a future position and a net charge of each atom in a molecule, based on a current position and charge of each atom. By repeating such a calculation millions of times, the shader program can calculate a theoretical steady-state configuration of the overall molecule. In such applications, the graphics pipeline is not limited to the conventional process of computing or determining color and intensity values for each pixel of a display.

However, getting transformed vertex data out of the graphics rendering pipeline has proven to be somewhat difficult. One approach is to write the transformed data from the frame buffer to a buffer object once the data has been processed by the graphics pipeline and written to the frame buffer. Since the fragment shader is typically the only part of the graphics pipeline able to compute values written to the frame buffer, this approach requires that the transformed vertex data be passed completely through the pipeline, even though no downstream processing may be performed on the transformed vertex data. Moreover, the fragment shader is typically configured to write pixel data to the frame buffer. Therefore, if other data representations are desired, such as an array of vertex attributes, then the application developer has to map the transformed vertex data output from either the vertex shader or the geometry shader into a pixel format so that the data can then be written to the frame buffer. Once the transformed graphics data has been written into the frame buffer, then the data has to be mapped back from a pixel formal to the desired format (i.e., as an array of vertex attributes). Thus, this approach may require substantial overhead, especially if the pixel data needs to be passed back to the CPU to be reformatted into a vertex data representation, which is often the case.

Another approach is to configure the graphics API to allow a graphics developer to insert tokens into a stream of data passed to the graphics pipeline to allow portions of the data to be written to a buffer object after being processed by a particular processing unit in the graphics pipeline. This approach is used by the Open GL feedback mode and allows developers to insert tokens into the graphics rendering pipeline with a point, line, or triangle. For example, a token may specify to write a set of vertices following the token into a buffer as a triangle or other graphics primitive once the graphics processing unit has processed the vertices. Different tokens are typically provided for different graphics primitives, resulting in a buffer format of:

<token_triangle> <triangle data>, <token_point> <point data>

One drawback of this approach is that the results of the graphics processing pipeline are written to a CPU system memory buffer. The data written to the system memory buffer may include both the results of the graphics rendering pipeline as well as which tokens were passed through the pipeline with the data. Thus, the graphics pipeline cannot directly process the results of the graphics rendering pipeline. More specifically, before the graphics pipeline can receive any of the transformed data stored in a buffer object using this approach, the transformed data must first be copied from the buffer object into system memory, parsed by the CPU, formatted into an appropriate form, and then passed back to the graphics pipeline for further processing. Thus, this approach incurs a substantial performance penalty.

In addition, some graphics APIs have allowed graphics developers to compose a shader program that enables certain attributes of transformed vertices to be written to a buffer object as part of the shader program. However, this approach directly ties writing certain vertex attributes to the buffer object to a particular shader program. If the graphics developer desires to change which attributes are written to the buffer object, then the shader program currently bound to the relevant processing unit must be unbound from that processing unit and a new shader program that includes instructions for writing the desired transformed vertex attributes to the buffer object must then be bound to the processing unit. This process must be followed, even when the only difference between the two shader programs lies in which transformed vertex attributes each program writes to the buffer object. The delay created by unbinding a shader program from a processing unit just to change which transformed vertex attributes are written to the buffer object may, in some cases, cause an unacceptable performance bottleneck for data processing on the GPU, thereby limiting the usefulness of this API feature.

As the foregoing illustrates, what is needed in the art is way to access transformed vertex data in a graphics processing pipeline that avoids one or more of the problems set forth above.

SUMMARY OF THE INVENTION

One embodiment of the present invention sets forth a method for storing attributes of vertices transformed in a graphics rendering pipeline. The method includes the steps of allocating memory space in a memory for a transform feedback buffer, selecting one or more attributes of the transformed vertices to store in the transform feedback buffer independently (in that the set of variables captured is not compiled into a shader program) executing on processing units in the graphics rendering pipeline, and configuring the transform feedback buffer to store the one or more attributes of the transformed vertices. The method also includes the step of initiating a processing mode wherein vertex data is processed by a processing unit in the graphics rendering pipeline to produce the transformed vertices, and the one or more attributes of the transformed vertices are then written to the transform feedback buffer. Additionally, a query mechanism may be used to determine the number of primitives written to the transform feedback buffer. In some cases, a graphics application can determine in advance know up front how many vertices were written to the transform feedback buffer; however, for a geometry shader, the number of primitives written may depend on the execution of the shader itself and may not be known in advance. In this case, the application may issue a query to determine how much data is in the transform feedback buffer.

One advantage of the disclosed method is that by providing API calls to define, initiate and end transform feedback, a transform feedback buffer may be used to record transformed vertices over one or more passes through a graphics rendering pipeline, without having to map the data to a pixel format, store the pixels in a frame buffer, and then map the pixels back to a vertex format for storage in another buffer. Further, because the API calls allow the transform feedback buffer to be configured independently from the shader programs executing on the different processing units of the graphics rendering pipeline, the attributes written to the transform feedback buffer may be modified without having to load new shader programs onto the GPU, as is required by other approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. Note, however, that the appended drawings illustrate only typical embodiments of this invention and are therefore not to be considered limiting of its scope, for the invention may admit to other equally effective embodiments.

DETAILED DESCRIPTION

Figure 1:
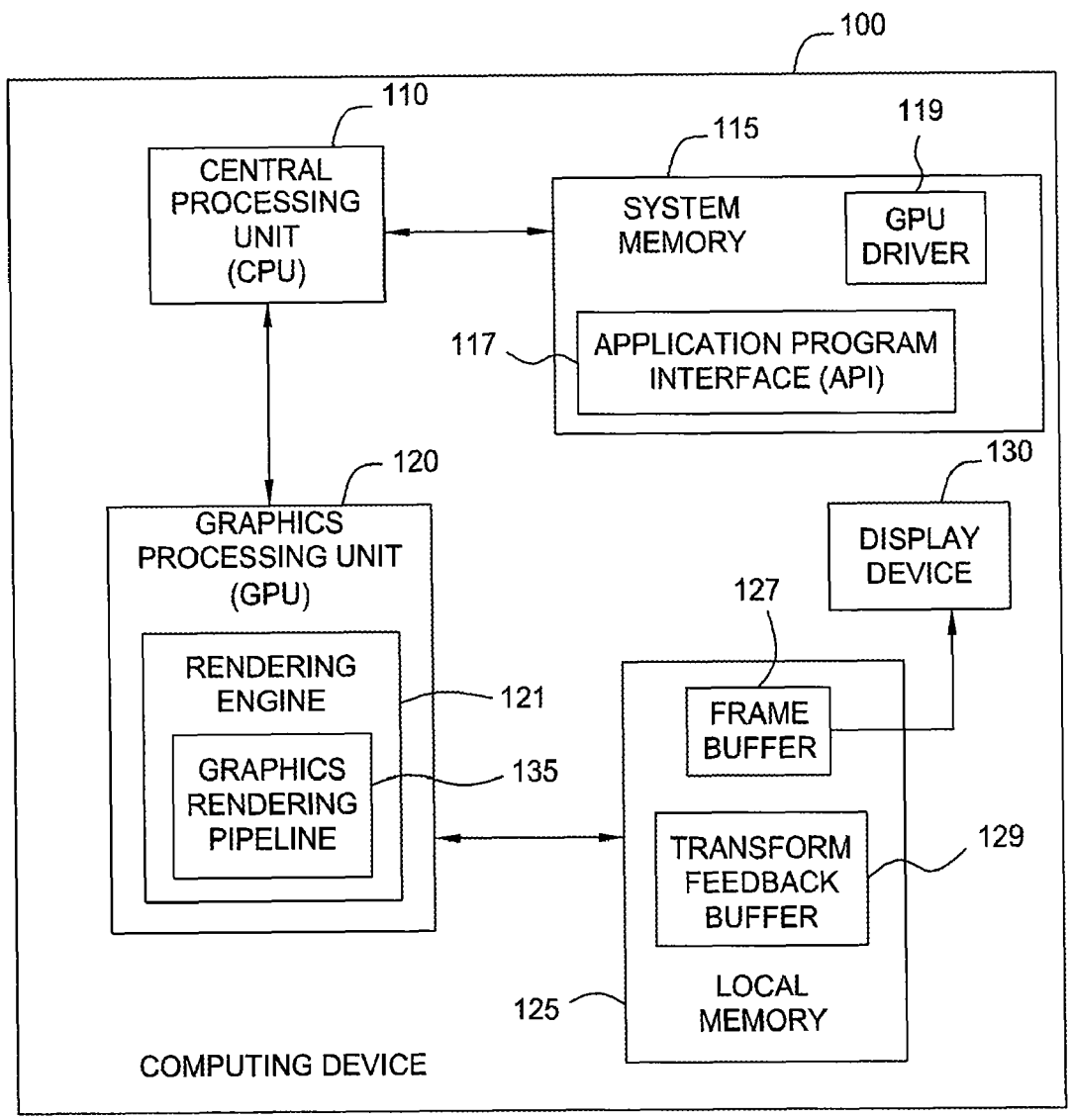
FIG. 1 is a block diagram illustrating an exemplary architecture for a computing device, according to one embodiment of the invention.

Embodiments of the invention provide an application programming interface (API) and associated constructs to take advantage of new processing capabilities of GPUs, such as the ability to provide and use feedback and record transformed vertices.

Once a transform feedback buffer is defined, a graphics developer may initiate and end a transform feedback mode using an API call. While active, transformed vertex attributes written by a vertex processing unit and, in some cases, transformed vertex attributes written by a geometry processing unit are written to a transform feedback buffer. Further, a graphics hardware device may provide multiple transform feedback buffers. The transformations may include fixed function processing performed by either the vertex shader or the geometry shader. For example, a graphics hardware device may provide a fixed-function mode that transforms vertices, evaluates lighting equations, and generates texture and fog coordinates in a non-programmable fashion. The transformations may also include vertex transformations carried out using vertex shader programs running on a vertex processing unit and, if active, those carried out geometry shader program running on a geometry processing unit. In either case, the vertex transformations may be recorded in the transform feedback buffer prior to clipping or similar rasterizing operations typically performed to graphics data passed through the graphics pipeline. Doing so is useful in cases where the processing units are used to process data sets not intended for producing display images.

Additionally, which transformed vertex attributes, i.e., attributes of the vertex data processed by the vertex processing unit and, if active, by the geometry processing unit, and how those attributes are recorded into the transform feedback buffer may be specified when the transform feedback buffer is defined. For example, a graphics developer may use an API call to define a transform feedback buffer to store multiple vertex data attributes in an interleaved fashion within a single buffer. Alternatively, a graphics developer may define multiple transform feedback buffers, each used to store a different set of transformed vertex attributes.

Also, should the graphics developer desire to change which transformed vertex attributes are being written, a new transform feedback buffer may be defined and used to store the new attributes. Similarly, when processing data using fixed-function attributes or assembly-level shader programs, the particular shader programs (or fixed-function mechanisms) running on the different processing units in the graphics pipeline may be changed without disrupting the transform feedback mode. Thus, embodiments of the invention provide a highly flexible and configurable approach to feeding back and recording transformed vertices relative to prior art techniques. For linked high-level shader programs, the particular set of attributes captured during transform feedback is tied to the shader program running on the processing units of the graphics rendering pipeline. However, the set of attributes captured may be changed dynamically without recompiling the shader, so long as the new attributes are produced by the shader program.

Further, transformed vertex data written to the transform feedback buffer may be accessed by the different processing units in the graphics pipeline as needed. For example, by formatting the data stored in the transform feedback buffer as a texture image, the different processing units of the graphics pipeline may sample the transformed vertices using an texture lookup functions. In a particular embodiment, extensions to the OpenGL graphics API described in a commonly assigned application titled: "Indexed Access to Texture Buffer Objects Using a Graphics Library," filed on Dec. 12, 2006 and having Ser. No. 11/609,859 may be used.

If the transform feedback buffer is set up to store transformed vertices over each pass through the graphics pipeline, then vertices may be cycled through the graphics pipeline repeatedly, without being passed back to the system memory or CPU. Processing data in such a fashion may greatly improve processing performance on certain datasets.

FIG. 1 is a block diagram illustrating an exemplary architecture for a computing device 100, according to one embodiment of the invention. As shown, computing device 100 includes, without limitation, a central processing unit (CPU) 110 connected to a system memory 115, a graphics processing unit (GPU) 120, and a local memory 125 coupled to GPU 120 and to a display device 130. GPU 120 includes at least one rendering engine 121 that incorporates at least one graphics rendering pipeline 135 used to process graphics data. System memory 115 includes a GPU driver 119 and an application program interface (API) 117. Generally, GPU driver 119 implements the functions and data structures exposed by API 117 for a given GPU 120.

Local memory 125 stores, among other things, transformed vertex attributes in a transform feedback buffer 129 and graphics data rendered by GPU 120 in a frame buffer 127. When a display frame is completed, the contents of frame buffer 127 may be output to display device 130 for display. Typically, display device 130 is a CRT or LCD display. Persons skilled in the art will recognize that any system having one or more processing units configured to implement the teachings disclosed herein falls within the scope of the present invention. For example, computing device 100 may be, without limitation, a desk-top computer, a laptop computer, a mobile telephone, a set-top box or a personal digital assistant device. Thus, the architecture of computing device 100 in no way limits the scope of the present invention. Further, In alternate embodiments, the CPU 110, GPU 120, the system interface between these processing units (not shown), or any combination thereof, may be integrated into a single processing unit. Further, the functionality of GPU 120 may be included in a chipset of in some other type of special purpose processing unit or co-processor.

Figure 2:
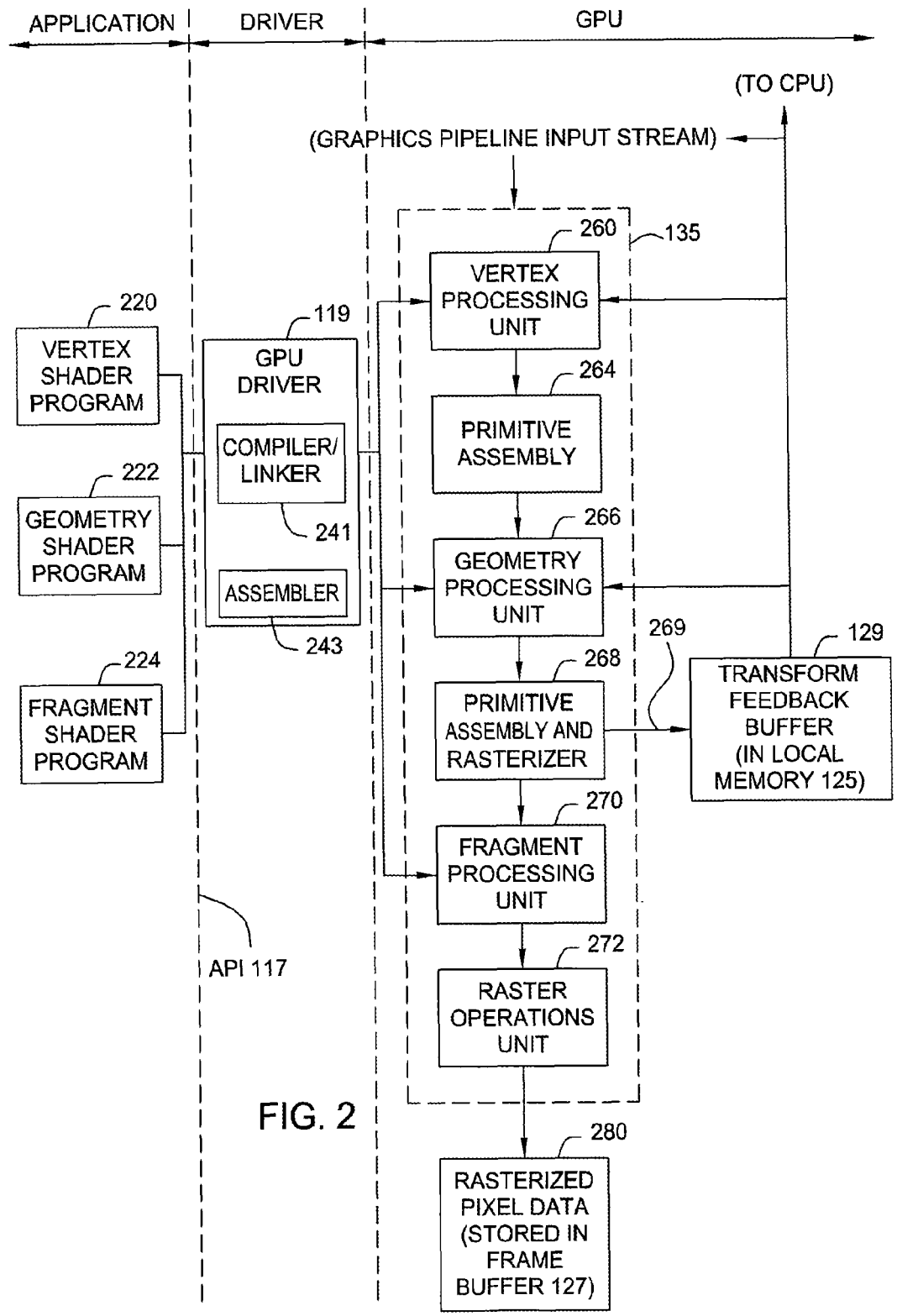
FIG. 2 is a conceptual illustration showing a graphics hardware pipeline in which vertex transformations may be recorded in a transform feedback buffer, according to one embodiment of the invention.

FIG. 2 is a conceptual illustration showing a graphics rendering pipeline 135 in which transformed vertices may be written to a transform feedback buffer 129 within local memory 125, according to one embodiment of the invention. Alternatively, the transform feedback buffer may be in a region of system memory 115 made accessible to GPU 120. FIG. 2 illustrates the components of an application, driver, and GPU. As shown, graphics rendering pipeline 135 includes a vertex processing unit 260, a geometry processing unit 266, a fragment processing unit 270, and a raster operations unit 272. When used to process graphics data to generate display images, data flows into the top of the graphics rendering pipeline 135, is processed by the vertex processing unit 260, the geometry processing unit 266, the fragment processing unit 270 and the raster operations unit 272 and is then written into the frame buffer 127. Generally, the output of graphics rendering pipeline 135 includes a set of rasterized pixel data 280 specifying color and intensity values for pixel positions on display device 130.

Between vertex processing unit 260, geometry processing unit 266 and fragment processing unit 270 are primitive assembly unit 264 and, optionally, primitive assembly and rasterizer unit 268. The primitive assembly unit 264 is typically a fixed-function unit that receives processed vertex data from vertex processing unit 260 and constructs graphics primitives, e.g., points, lines, triangles, or the like, for processing by geometry processing unit 266. If geometry processing unit 266 is enabled, primitive assembly and rasterizer unit 268 may receive the graphics primitives output by geometry processing unit 266, such as a set of triangles, and perform clipping operations to limit the triangles passed to fragment processing unit 270 to ones that might be viewable on display device 130. If geometry processing unit 266 is not enabled, the primitives assembled by primitive assembly unit 264 are passed directly to primitive assembly and rasterizer unit 268 that generates fragments processed by geometry processing unit 270.

As previously described herein, the actual processing performed by vertex processing unit 260 and geometry processing unit 266 may be defined by various fixed-functions specific to each of these two processing units or may be defined by separate shader programs, each configured to execute on a different one of these two processing units. Illustratively, FIG. 2 shows a vertex shader program 220, a geometry shader program 222, and a fragment shader program 224. In one embodiment, these shader programs may be written using a high-level shading language, such as the OpenGL™ Shading Language (GLSL), and transmitted to API 117 for processing within GPU driver 119. In one embodiment, the shader programs may then compiled and linked by a compiler/linker 241 included with GPU driver 119 to produce a linked assembly code version of the shader programs. Alternatively, compiler/linker 241 may be implemented to generate machine code directly.

The assembly code is then converted into machine code (also referred to as "microcode") by an assembler 243 also included in GPU driver 119. The machine code versions of the shader programs are then transmitted to the vertex processing unit 260, the geometry processing unit 266 and the fragment processing unit 270, as the case may be, for execution. In alternative embodiments, the vertex shader program 220, the geometry shader program 222 and the fragment shader program 224 may be written in assembly code or may be compiled into assembly code externally to GPU driver 119. In such embodiments, the GPU driver would not necessarily include compiler/linker 241 and would receive assembly code versions of the shader programs directly. Assembler 243 would then convert the assembly code into machine code and transmit the machine code versions of the shader programs to the appropriate processing units of the graphics rendering pipeline 135, as set forth above.

As also shown, graphics rendering pipeline 135 also includes a transform feedback path 269 used to write attributes of transformed vertices from graphics rendering pipeline 135 into transform feedback buffer 129. As set forth below in the next section, new API calls provided by graphics API 117 may be used to bind transform feedback buffer 129 to the output of transform feedback path 269, to define which transformed vertex attributes are to be stored in transform feedback buffer 129, and to enable and disable transform feedback mode, while graphics rendering pipeline 135 is active.

When transform feedback is active, attributes of the vertices processed by vertex processing unit 260 or, if active, geometry processing unit 266, may be written into transform feedback buffer 129. If a geometry program is used, transform feedback buffer may be used to capture captures outputs of geometry processing unit 266. In such a case, the transformed values written by the vertex processing unit may be used to generate values passed to the geometry program running on geometry processing unit 266. Otherwise, in the case where no geometry program is used, transform feedback mode may be used to capture the output of the vertex processing unit 260.

Depending on how transform feedback mode is set up, the attributes may be written with each attribute in separate transform feedback buffers or with all attributes interleaved into a single transform feedback buffer. However, if the geometry portion of graphics rendering pipeline 135 is disabled, then the attributes written to transform feedback buffer 129 are those of vertices processed only by vertex processing unit 260. In this second case, vertices processed by vertex processing unit 260 pass through graphics rendering pipeline 135 unchanged by geometry processing unit 266. The vertices are then transmitted to transform feedback path 269 and written to feedback buffer 129. Additionally, transform feedback path 269 may be configured such that transformed vertex attributes are captured and written to transform feedback buffer 129 prior to clipping operations performed by primitive assembly block 268. If the primitives are not used apart from the transform feedback buffer 129, a "rasterizer discard" mode may be used to discard primitives after they have been written to the transform feedback buffer. Otherwise, however, the captured primitives may be rasterized by primitive assembly and rasterizer unit 268, processed by fragment processing unit 270, raster operations unit 272 and stored as rasterized pixel data 280 in frame buffer 127.

In one embodiment, the attributes recorded in transform feedback buffer 129 may be stored as an array of vertex attributes. By using such regular representations, the array of transformed vertex attributes may be accessed by one or more of the processing units of graphics rendering pipeline 135 in subsequent rendering passes, without any intervention from CPU 110 or any requirement that the data first be copied to system memory 115. In other cases, transformed vertex attributes written to transform feedback buffer 129 may be directly accessed by CPU 110 for further processing. For example, vertex shader program 220 may perform intermediate processing operations on a set of vertices, and the resulting transformed vertices may be written to transform feedback buffer 129 as a set of formatted vertices. CPU 110 may then access this set of vertices directly from transform feedback buffer 129, as opposed to having to access the data from frame buffer 127 after the data has been converted to a pixel format. Importantly, accessing the data from frame buffer 127 requires that the GPU driver 119 convert the data from an optimized hardware representation to a form more readily processed by the CPU. In other words, the disclosed transform feedback functionality enables the superior capabilities of graphics rendering pipeline 135 to be used to process certain datasets, without the extra expense of passing the data completely through the graphics rendering pipeline 135 to the frame buffer 127 and then reformatted that data from a pixel format to a vertex format.

Figure 3:
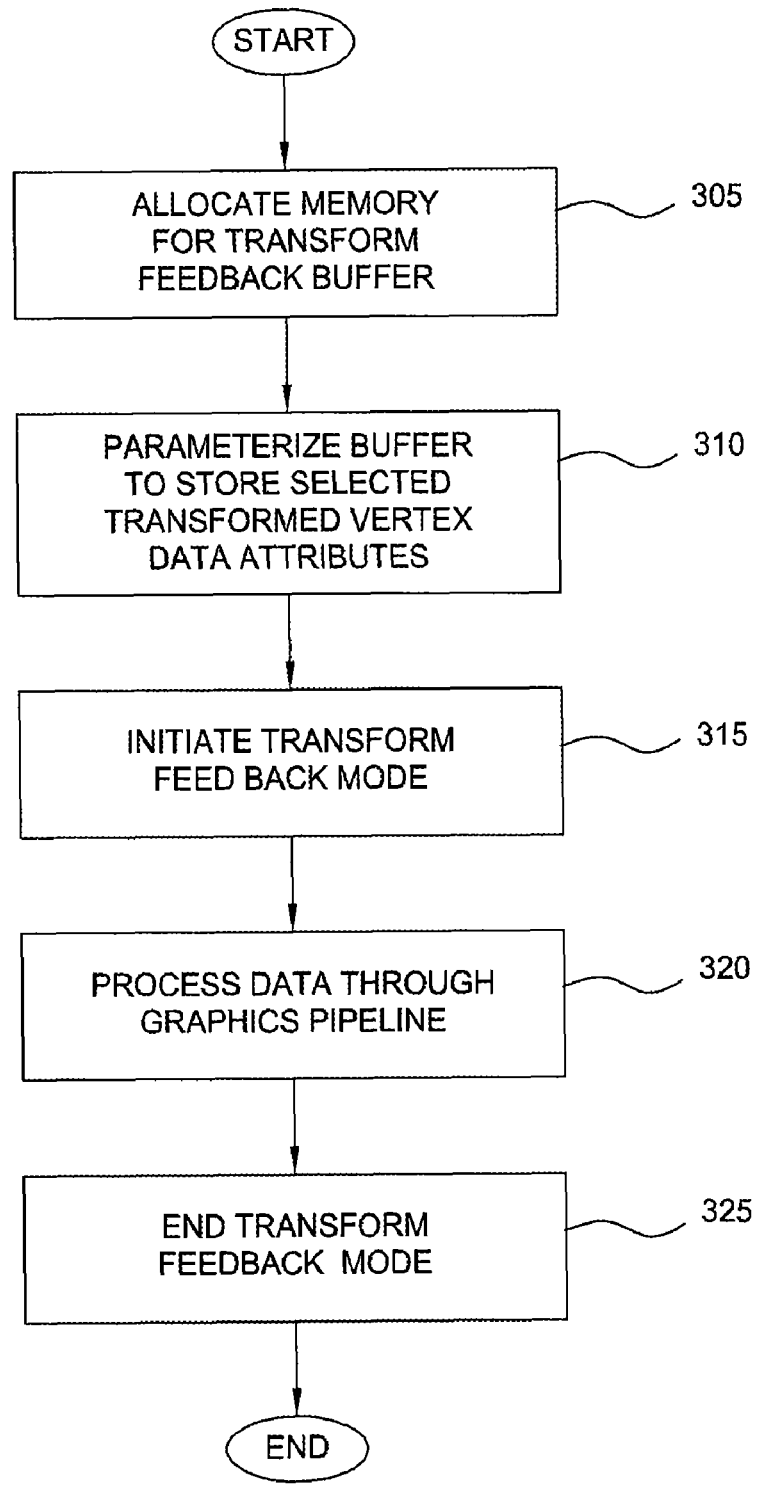
FIG. 3 is a flow diagram of method steps for feeding back and recording transformed vertices in a graphics rendering pipeline, according to one embodiment of the invention.

FIG. 3 is a flow diagram of method steps for feeding back and recording transformed vertices in a graphics rendering pipeline, according to one embodiment of the invention. Persons skilled in the art will understand that, even though the method is described in conjunction with the systems of FIGS. 1 and 2, any system configured to perform the method steps, in any order, is within the scope of the present invention.

As shown, method 300 begins at step 305, where a buffer may be bound to the output of the transform feedback path 269 to create transform feedback buffer 129. Memory space is allocated within local memory 125 for transform feedback buffer 129. In one embodiment, the relevant API call may have a signature like the following:

void BindBufferBaseEXT (enum target, uint index, uint buffer)

The <target> parameter is the constant TRANSFORM_FEEDBACK_BUFFER_EXT, indicating transform feedback usage. The <index> parameter is the transform feedback buffer number (e.g., 0-3 if the implementation supports capturing to four buffers simultaneously). The <buffer> parameter is the name of a buffer object that has previously been set up to capture transform feedback data.

At step 310, the transformed vertex attributes to be written to transform feedback buffer 129 are specified. For example, after binding transform feedback buffer 129 to transform feedback path 269, an application developer may use an API call to specify which attributes to store in the transform feedback buffer. In one embodiment, the relevant API calls may have signatures like the following:

void TransformFeedbackAttribsEXT(sizei count, const int *attribs, enum bufferMode);
void TransformFeedbackVaryingsEXT(uint program, size i count, const int *locations, enum bufferMode);

The parameters passed to these API calls are described in greater detail below.

After the setup actions performed in step 305 and 310, the transform feedback buffer 129 is configured to store attributes of vertices transformed by vertex processing unit 260 and, if active, geometry processing unit 266. Importantly, attributes of the transformed vertices are stored in the transform feedback buffer independently of any shader programs executing on any processing units in graphics rendering pipeline 135. At step 315, transform feedback mode may be activated. For example, another API call may be used to activate the transform feedback path 269 shown in FIG. 2. At step 320, the specified attributes of data sets processed by vertex processing unit 260 and the geometry processing unit 266, if any, are recorded in the transform feedback buffer defined in steps 305 and 310.

Figure 4A:
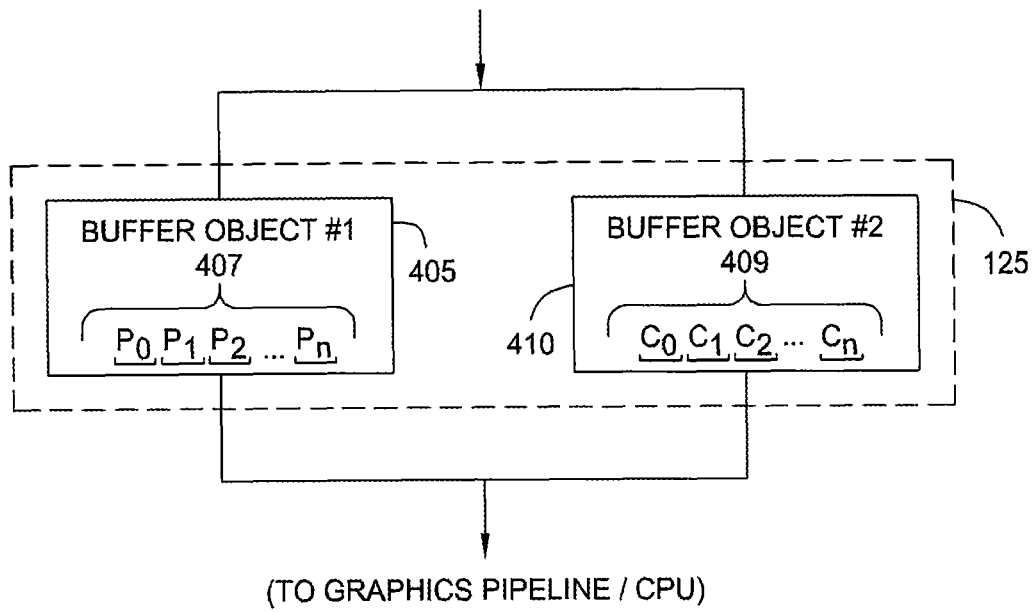
FIGS. 4A-4B are conceptual illustrations of transform feedback buffers configured to record attributes of transformed vertices in an interleaved and non-interleaved format, according to embodiments of the invention.
Figure 4B:
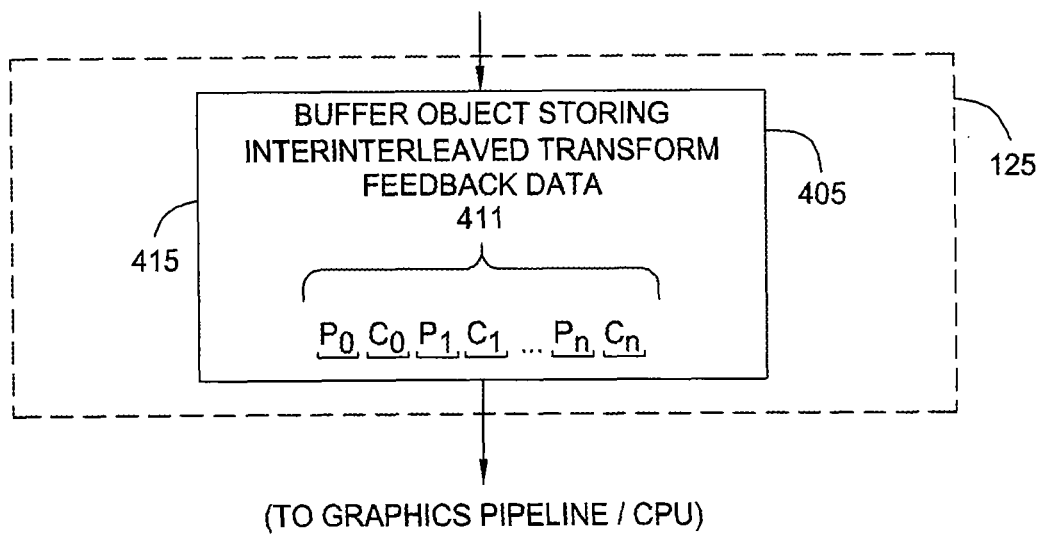

At step 325, transform feedback mode may be ended by invoking another API call. In one embodiment, the relevant API calls may have signatures like the following:

void BeginTransformFeedbackEXT(enum primitiveMode);
void EndTransformFeedbackEXT( );

FIGS. 4A-4B are conceptual illustrations of transform feedback buffers configured to record attributes of transformed vertices in an interleaved and non-interleaved format, according to embodiments of the invention. FIG. 4A illustrates a transform feedback buffer 405 and a transform feedback buffer 410 storing position and color attributes of vertices, respectively, in a non-interleaved format. Again, the memory for transform feedback buffers 405 and 410 is allocated within local memory 125. As shown, transform feedback buffer 410 includes a one-dimensional array 407 of vertex positions labeled $P_0$, $P_1$, through $P_N$. Each element of array 407 represents position attributes for a vertex processed by vertex processing unit 260 or, if active, geometry processing unit 266. Similarly, each element of array 409 represents color attributes for a vertex processed by vertex processing unit 260 or, if active, geometry processing unit 266.

FIG. 4B illustrates a transform feedback buffer 415 storing position and color attributes in an interleaved format. Like transform feedback buffers 405 and 410, memory for transform feedback buffer 415 is allocated within local memory 125. As shown, transform feedback buffer 415 includes a one-dimensional array 411 of elements labeled $P_0 C_0$, $P_1 C_1$, through $P_N C_N$. Each element of array 411 includes both position and color attributes for a vertex processed by vertex processing unit 260 and, if active, geometry processing unit 266. Thus, the position and color attributes are stored in an interleaved fashion across the different elements in the array 411.

Figure 5A:
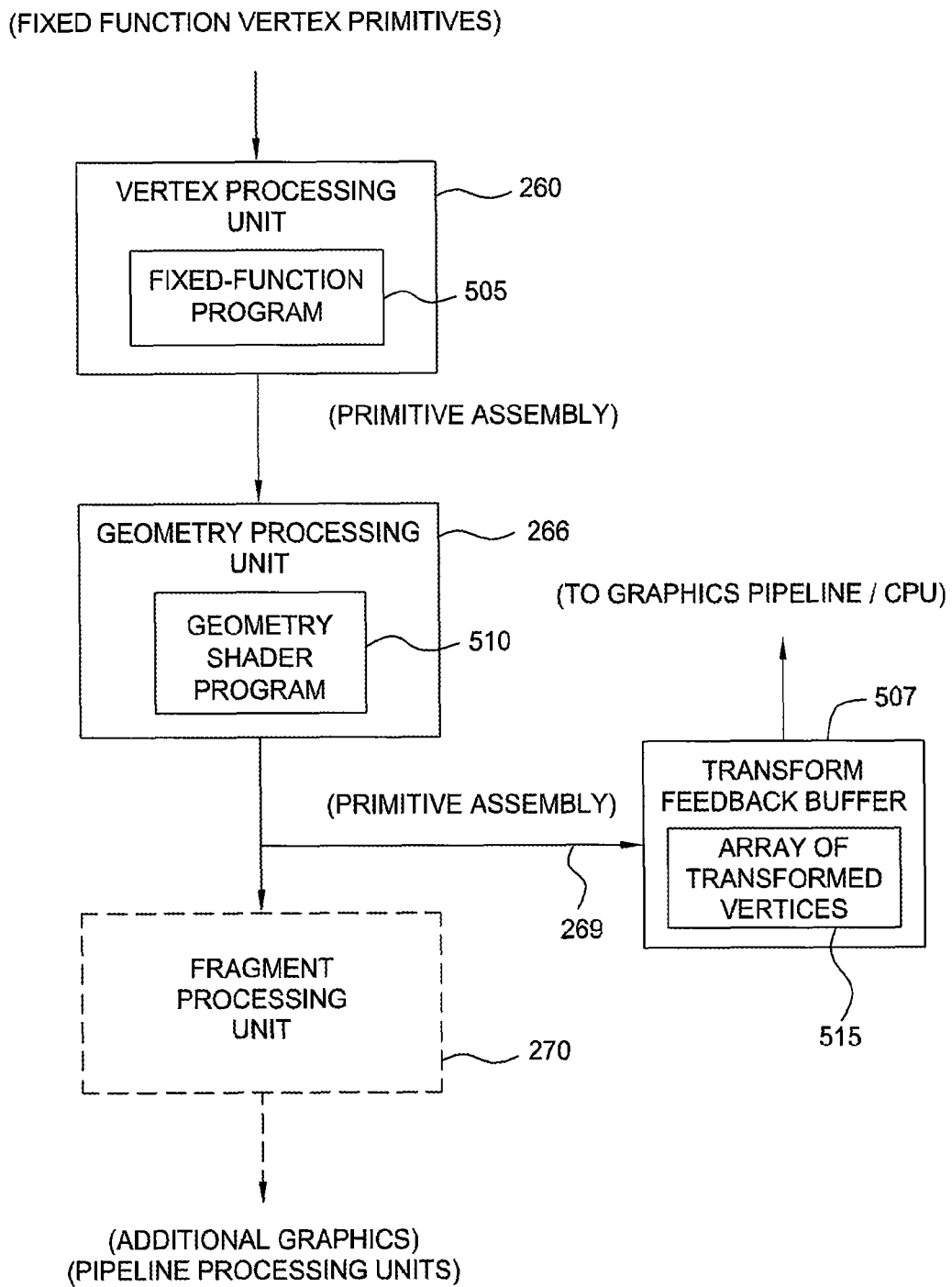
FIGS. 5A-5B are conceptual illustrations showing portions of the graphics rendering pipeline of FIG. 2 being used to record fixed function vertex transformations and shader program vertex transformations, according to embodiments of the invention.
Figure 5B:
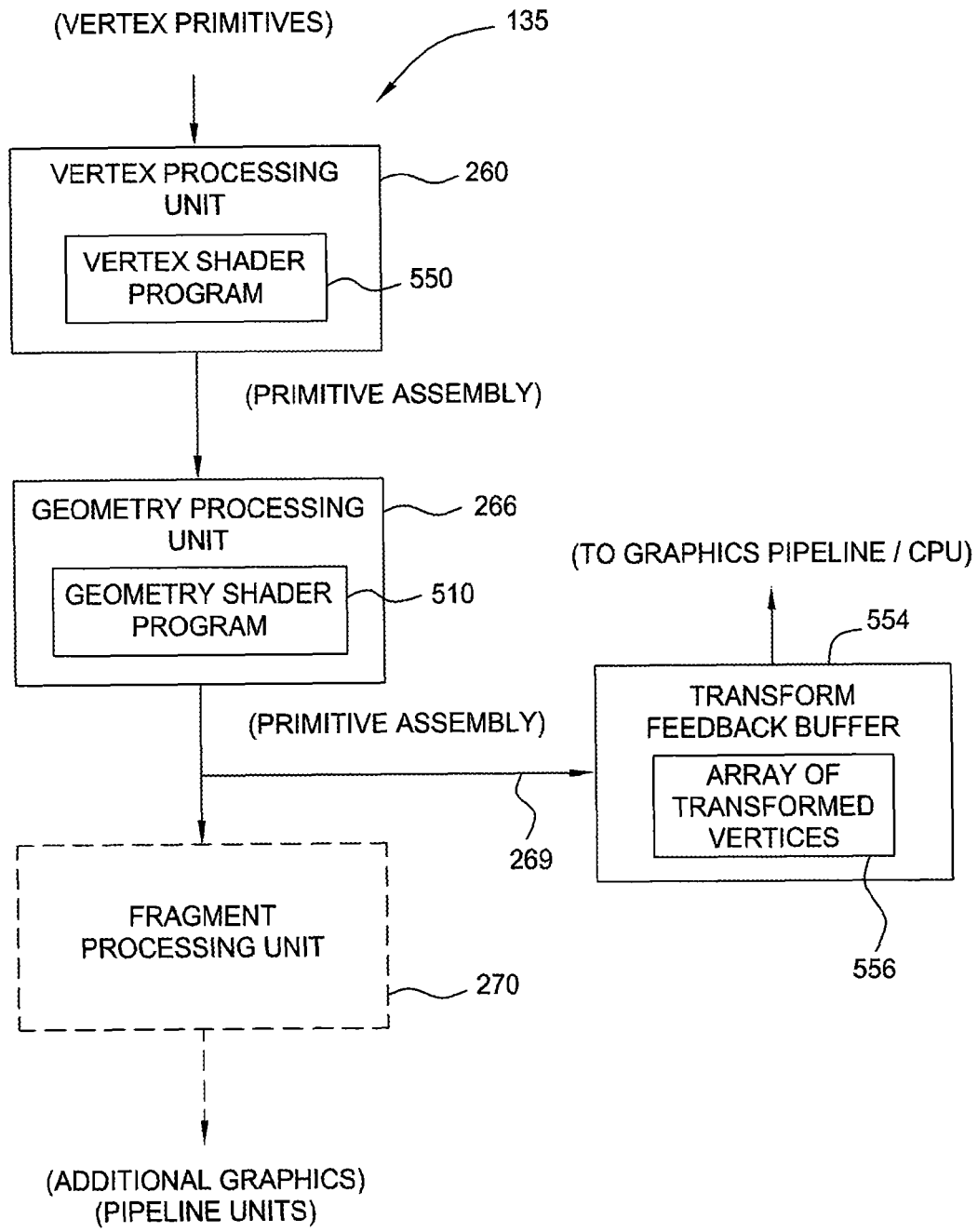

FIGS. 5A-5B are conceptual illustrations showing portions of the graphics rendering pipeline 135 of FIG. 2 being used to record fixed-function vertex transformations and programmable vertex transformations, according to embodiments of the invention. FIG. 5A illustrates a configuration of graphics rendering pipeline 135 when transform feedback mode is active and transformed vertices are written to a transform feedback buffer 507 after fixed-function processing by vertex processing unit 260 and, if running, a geometry shader program 510 running on geometry processing unit 266. In any case, attributes of the transformed vertices output from geometry processing unit 266 are passed to transform feedback path 269 and written to transform feedback buffer 507 as an array of transformed vertices 515. The transformed vertices output by geometry processing unit 266 may additionally continue to be processed by graphics pipeline 135, as illustrated by the dashed lines of fragment processing unit 270. That is, the primitives/vertices recorded into transform feedback buffer 507 may also be sent to fragment processing unit 270. Otherwise, if a "rasterizer discard" mode is active, the primitives output from the geometry processing unit are discarded and not processed any further by the graphics rendering pipeline.

FIG. 5B illustrates a configuration of graphics rendering pipeline 135 when transform feedback mode is active and transformed vertices are written to a transform feedback buffer 554 after programmable processing by vertex processing unit 260 and, optionally, geometry processing unit 266. As shown, vertex processing unit 260 processes vertices using a vertex shader program 550 executed on vertex processing unit 260. The transformed vertices output by vertex processing unit 260 are passed to geometry processing unit 266. If active, geometry processing unit 266 processes these transformed vertices using a geometry shader program 560 executed on geometry processing unit 266. Again, in either case, attributes of the transformed vertices output from geometry processing unit 266 are passed to transform feedback path 269 and written to transform feedback buffer 554 as an array of transformed vertices 556. The transformed vertices output by geometry processing unit 266 may also continue to be processed by graphics pipeline 135, as illustrated by the dashed lines of fragment processing unit 270.

Advantageously, by providing API calls to define, initiate and end transform feedback, a transform feedback buffer may be used to record transformed vertices over one or more passes through a graphics rendering pipeline, without having to convert the data to a pixel format, store the pixels in a frame buffer, and then map the pixels back to a vertex format for storage in another buffer. Since these mappings do not occur, no data processing is required to be performed by a system CPU; instead, the data processing may remain within the graphics hardware and graphics pipeline, improving the processing efficiency. Further, because the API calls allow the transform feedback buffer to be configured independently of the shader programs executing on the different processing units of the graphics rendering pipeline, the attributes written to the transform feedback buffer may be modified without having to load new shader programs onto the GPU, as is required by other approaches.

Application Programming Interface Extensions

The following discussion describes extensions to the OpenGL™ API and related APIs to implement feedback and recording of vertex transformations in a graphics processing pipeline as described herein. Persons skilled in the art will appreciate that the information in this section should be considered in conjunction with the current OpenGL 2.0™ specification.

Importantly, the extensions presented herein introduce API calls to the OpenGL API and the GLSL that may be used to create a transform feedback buffer, to specify which attributes vertex data to write to the transform feedback buffer, and to begin and end transform feedback mode.

TABLE 1

New Procedures and Functions void BindBufferRangeEXT(enum target, uint index, uint buffer. intptr
    offset, sizeiptr size);
void BindBufferOffsetEXT(enum target, uint index, uint buffer, intptr
offset);
void BindBufferBaseEXT(enum target, uint index, uint buffer);
void TransformFeedbackAttribsEXT(sizei count, const int *attribs, enum
    bufferMode);
void TransformFeedbackVaryingsEXT(uint program, sizei count, const
    int *locations, enum bufferMode);
void BeginTransformFeedbackEXT(enum primitiveMode);
void EndTransformFeedbackEXT( );
int GetVaryingLocationEXT(uint program, const char *name);
void GetActiveVaryingEXT(uint program, uint index, sizei bufSize, sizei
    *length, int *size, enum *type, char *name);
void ActiveVaryingEXT(uint program. const char *name);
void GetTransformFeedbackVaryingEXT(uint program, uint index, int
    *location);
void GetIntegervIndexedEXT(enum param, int index, int *values);
void GetBooleanvIndexedEXT(enum param, int index, boolean *values);

The following table sets forth tokens used by the above API calls:

TABLE 2

Tokens for Feedback and Record of Transformed Vertex Data

| Token | Numeric Value (if defined) |
|---|---|
| Accepted by the <target> parameters of BindBuffer, BufferData. BufferSubData, MapBuffer, unmapBuffer, GetBufferSubData, GetBufferPointerv, BindBufferRangeEXT, BindBufferoffsetEXT and BindBufferBaseEXT: | |
| TRANSFORM_FEEDBACK_BUFFER_EXT | 0X8C8E |
| Accepted by the <param> parameter of GetIntegervIndexedEXT, GetFloatvIndexedEXT, GetBooleanvIndexedEXT and GetDoublevIndexedEXT: | |
| TRANSFORM_FEEDBACK_BUFFER_START_EXT | 0x8C84 |
| TRANSFORM_FEEDBACK_BUFFER_END_EXT | 0x8C85 |
| TRANSFORM_FEEDBACK_RECORD_EXT | 0x8C86 |
| Accepted by the <param> parameter of GetIntegervIndexedEXT, GetFloatvIndexedEXT, GetBooleanvIndexedEXT, GetDoublevIndexedEXT, and by the <pname> parameter of GetBooleanv, GetDoublev, GetIntegerv, and GetFloatv: | |
| TRANSFORM_FEEDBACK_BUFFER_BINDING_EXT | 0x8C8F |
| Accepted by the <bufferMode> parameter of TransformFeedbackAttribsEXT and TransformFeedbackvaryingsEXT: | |
| TRANSFORM_FEEDBACK_INTERLEAVED_ATTRIBS_EXT | 0x8C8C |
| TRANSFORM_FEEDBACK_SEEPARATE_ATTRIBS_EXT | 0x8C8D |
| Accepted by the <target> parameter of BeginQuery, EndQuery, and GetQueryiv: | |
| PRIMITIVES_GENERATED_EXT | 0x8C87 |
| TRANSFORM_FEEDBACK_PRIMITIVES_WRITTEN_EXT | 0x8C88 |
| Acepted by the <cap> parameter of Enable, Disable, and ISEnabled, and by the <pname> parameter of GetBooleanv, GetIntegerv, GetFloatv, and GetDoublev: | |
| RASTERIZER_DISCARD_EXT | 0x8C89 |
| Accepted by the <pname> parameter of GetBooleanv, GetDoublev, GetIntegerv, and GetFloatv: | |
| MAX_TRANSFORM_FEEDBACK_INTERLEAVED_COMPONENTS_EXT | 0x8C8A |
| MAX-TRANSFORM-FEEDBACK_SEPARATE_ATTRIBS_EXT | 0x8C8B |
| MAX-TRANSFORM_FEEDBACK_SEPARATE_COMPONENTS_EXT | 0x8C80 |
| TRANSFORM_FEEDBACK_ATTRIBS_EXT | 0x8C7E |
| TRANSFORM_FEEDBACK_BUFFER_MODE EXT | 0x8C7F |
| Accepted by the <pname> parameter of GetProgramiv: | |
| ACTIVE_VARYINGS_EXT | 0x8C81 |
| ACTIVE-VARYING_MAX_LENGTH_EXT | 0x8C82 |
| TRANSFORM_FEEDBACK_VARYINGS_EXT | 0x8C83 |
| TRANSFORM_FEEDBACK_PROGRAM_BUFFER_MODE_EXT | 0x8C7F |
| Accepted by the <attribs> parameter of TransformFeedbackAttribsEXT: | |
| BACK_PRIMARY_COLOR_EXT | 0x8C77 |
| BACK_SECONDARY_COLOR_EXT | 0x8C78 |
| TEXTURE_COORD_EXT | 0x8C79 |
| CLIP_DISTANCE_EXT | 0x8C7A |
| VERTEX_ID_EXT | 0x8C7B |
| PRIMITIVE_ID_EXT | 0x8C7C |
| GENERIC_ATTRIB_EXT | 0x8C7D |
| POINT_SIZE | 0x0B11 |
| FOG_COORDINATE | 0x8451 |
| SECONDARY_COLOR_EXT | 0x852D |
| PRIMARY_COLOR | 0x8577 |
| POSITION | 0x1203 |
| Returned by the <type> parameter of GetActivevaryingEXT: | |
| UNSIGNED_INT_VEC2-NV | 0x8DC6 |
| UNSIGNED_INT_VEC3-NV | 0x8DC7 |
| UNSIGNED_INT_VEC4_NV | 0x8DC8 |

Transform feedback is started and finished by calling the BeginTransformFeedbackEXT( ) and the EndTransformFeedbackEXT( ) API calls, respectively. Transform feedback is said to be active after a call to BeginTransformFeedbackEXT( ) and inactive after a call to EndTransformFeedbackEXT( ). Transform feedback is initially inactive. Transform feedback is performed after color clamping, but immediately before clipping in the OpenGL pipeline. <primitiveMode> is one of TRIANGLES, LINES, or POINTS, and specifies the output type of primitives that will be recorded into the buffer objects bound for transform feedback. <primitiveMode> places a restriction on the primitive types that may be rendered during an instance of transform feedback.

TABLE 3

Allowed combinations between the transform feedback primitive mode, as passed to BeginTransformFeedbackEXT, and the current primitive mode

| Transform Feedback primitive Mode | allowed render primitive modes |
|---|---|
| POINTS | POINTS |
| LINES | LINES, LINE_LOOP, and LINE_STRIP |
| TRIANGLES | TRIANGLES, TRIANGLE_STRIP, TRIANGLE_FAN, QUADS, QUAD_STRIP, and POLYGON |

If a geometry program or geometry shader is active, the output primitive type of the currently active program is used as the render primitive, otherwise the Begin mode is used.

Quads and polygons will be tessellated and recorded as triangles (the order of tessellation within a primitive is undefined); primitives specified in strips or fans will be assembled and recorded as individual primitives. Incomplete primitives are not recorded. Begin or any operation that implicitly calls Begin (such as DrawElements) will generate INVALID_OPERATION if the begin mode is not an allowed begin mode for the current transform feedback buffer state. If a geometry program or geometry shader is active, its output primitive mode is used for the error check instead of the begin mode.

A buffer object is made to be a target of transform feedback by calling one of BindBufferRangeEXT( ), BindBufferOffsetEXT( ), and BindBufferBaseEXT( ). where the <target> parameter is set to TRANSFORM_FEEDBACK_BUFFER_EXT. Any of the three BindBuffer* commands perform the equivalent of the BindBuffer(target, buffer) API call. The <buffer> parameter specifies which buffer object to bind to the target at index number <index>. The <index> parameter exists for use with the TRANSFORM_FEEDBACK_SEPARATE_ATTRIBS_EXT mode and must be less than the value of MAX_TRANSFORM_FEEDBACK_SEPARATE_ATTRIBS_EXT, which indicates the implementation-dependent maximum number of transform feedback buffers that can be used in separate attribute mode. The <offset> parameter specifies a starting offset into the buffer object <buffer>. The <size> parameter specifies the number of elements that can be written during transform feedback mode. Both <offset> and <size> are in basic machine units. BindBufferBaseEXT is equivalent to calling BindBufferOffsetEXT with an <offset> of 0. BindBufferOffsetEXT is the equivalent of calling BindBufferRangeEXT with <size>=sizeof(buffer)−<offset> and rounding <size> down so that it is word-aligned.

If recording the vertices of a primitive to the buffer objects being used for transform feedback purposes would result in either exceeding the limits of any buffer object's size, or in exceeding the end position <offset>+<size>−1, as set by BindbufferRangeEXT, then no vertices of the primitive are recorded, and the counter corresponding to the asynchronous query target TRANSFORM_FEEDBACK_PRIMITIVES_WRITTEN_EXT is not incremented.

The API functions listed above include two methods used to specify which transformed vertex attributes are streamed to one, or more, buffer objects in transform feedback mode. If an OpenGL Shading Language vertex and/or geometry shader is active, then the state set with the TransformFeedbackVaryingsEXT( ) command determines which attributes to record. If neither a vertex nor geometry shader is active, the state set with the TransformFeedbackAttribsEXT( ) command determines which attributes to record. When a program object containing a vertex shader and/or geometry shader is active, the set of vertex attributes recorded in transform feedback mode is specified using the TransformFeedbackVaryingsEXT( ) API call. This command sets the transform feedback state for <program> and specifies which varying variables to record when transform feedback is active. The array <locations> contains <count> locations of active varying variables, as queried with the GetVaryingLocationEXT( ) API call, to stream to a buffer object. The <bufferMode> parameter is one of TRANSFORM_FEEDBACK_INTERLEAVED_ATTRIBS_EXT or TRANSFORM_FEEDBACK_SEPARATE_ATTRIBS_EXT.

In the TRANSFORM_FEEDBACK_INTERLEAVED_ATTRIBS_EXT mode, varying variables are written, interleaved, into one buffer object. This is the buffer object bound to index 0. Varying variables are written out to that buffer object in the order that they appear in the array <locations>. In the TRANSFORM_FEEDBACK_SEPARATE_ATTRIBS_EXT mode, varying variables are recorded, non-interleaved, into several buffer objects simultaneously. The first varying variable in the array <locations> is written to the buffer bound to index 0. The last varying variable is written to the buffer object bound to index <count>−1.

It is not necessary to (re-)link <program> after calling TransformFeedbackVaryingsEXT( ). Changes to the transform feedback state will be picked up right away after calling TransformFeedbackVaryingsEXT( ). The value for any attribute specified to be streamed to a buffer object but not actually written by a vertex or geometry shader is undefined.

When neither a vertex nor geometry shader is active, the set of vertex attributes recorded in transform feedback mode is specified using the API call TransformFeedbackAttribsEXT( ). This call specifies which attributes to record into one, or more, buffer objects. The value TRANSFORM_FEEDBACK_BUFFER_MODE_EXT will be set to <bufferMode> and the value TRANSFORM_FEEDBACK_ATTRIBS_EXT set to <count>.

The array <attribs> contains an interleaved representation of the attributes desired to be fed back containing 3*count values. For attrib i, the value at 3*i+0 is the enum corresponding to the attrib, as given in Table 3. The value at 3*i+1 is the number of components of the provided attrib to be fed back and is between 1 and 4. The value at 3*i+2 is the index for attribute enumerants corresponding to more than one real attribute. For an attribute enumerant corresponding to only one attribute, the index is ignored.

TABLE 4

Transform Feedback Attribute Specifiers

| Attrib | Permitted Sizes | Index? | GPU_program_4 result name |
|---|---|---|---|
| POSITION | 1, 2, 3, 4 | no | position |
| PRIMARY_COLOR | 1, 2, 3, 4 | no | color.front.primary |

TABLE 4-continued

Transform Feedback Attribute Specifiers

| Attrib | Permitted Sizes | Index? | GPU_program_4 result name |
|---|---|---|---|
| SECONDARY_COLOR | 1, 2, 3, 4 | no | color.front.secondary |
| BACK_PRIMARY_COLOR | 1, 2, 3, 4 | no | color.back.primary |
| BACK_SECONDARY_COLOR | 1, 2, 3, 4 | no | color.back.secondary |
| FOG_COORDINATE | 1 | no | fogcoord |
| POINT_SIZE | 1 | no | pointsize |
| TEXTURE_COORD | 1, 2, 3, 4 | yes | texcoord[index] |
| CLIP_DISTANCE | 1 | yes | clip[index] |
| VERTEX_ID | 1 | no | vertexid |
| PRIMITIVE_ID | 1 | no | primid |
| GENERIC_ATTRIB | 1, 2, 3, 4 | yes | attrib[index] |

The 'attrib' column specifies which attribute to record. The 'permitted sizes' column indicates how many components of the attribute can be recorded. The 'index' column indicates if the attribute is indexed. The 'gpu program 4' column shows which result variable of a vertex or geometry program corresponds to the attribute to record.

The TransformFeedbackAttribsEXT( ) API call sets a transform feedback state which is used both when the GL is in fixed-function vertex processing mode, as well as when an assembly vertex and/or geometry program is active. The parameter <bufferMode> has the same meaning as described for the TransformFeedbackVaryingsEXT( ) API call. Attributes are either written interleaved, or into separate buffer objects, in the same manner as described earlier for the TransformFeedbackVaryingsEXT( ).

In one embodiment of the invention, a computer-readable medium including a plurality of instructions that when executed by a processor causes a computing device to store attributes of vertices transformed in a graphics rendering pipeline, by performing the steps of allocating memory space in a memory for a transform feedback buffer, selecting one or more attributes of the transformed vertices to store in the transform feedback buffer independently of any shader programs executing on any processing units in the graphics rendering pipeline, configuring the transform feedback buffer to store the one or more attributes of the transformed vertices, and initiating a processing mode where vertex data is processed by a processing unit in the graphics rendering pipeline to produce the transformed vertices, and the one or more attributes of the transformed vertices are then written to the transform feedback buffer.

While the foregoing is directed to embodiments of the present invention, other and further embodiments of the invention may be devised without departing from the basic scope thereof, and the scope thereof is determined by the claims that follow

We claim:

1. A method for storing attributes of vertices transformed in a graphics rendering pipeline, the method comprising:
    allocating memory space in a memory for a transform feedback buffer;
    selecting one or more attributes of the transformed vertices to store in the transform feedback buffer independently of any shader programs executing on any processing units in the graphics rendering pipeline;
    configuring the transform feedback buffer to store the one or more attributes of the transformed vertices that are modified without loading a new shader program onto the graphics rendering pipeline;
    initiating a first processing mode wherein vertex data is processed by a processing unit in the graphics rendering pipeline to produce the transformed vertices, and the one or more attributes of the transformed vertices are then written to the transform feedback buffer; and
    after the one or more attributes are written to the transform feedback buffer, determining whether a second processing mode is enabled, wherein the transformed vertices are discarded from the graphics rendering pipeline when the second processing mode is enabled, or the transformed vertices are transmitted to a second processing unit in the graphics processing pipeline when the second processing mode is not enabled.

2. The method of claim 1, wherein a vertex processing unit produces the transformed vertices.

3. The method of claim 2, wherein the vertex processing unit is configured to perform fixed-function vertex processing, to execute microcode derived from a vertex shader program written in assembly code, or to execute microcode derived from a vertex shader program written in a high-level shading language.

4. The method of claim 1, wherein a geometry processing unit produces the transformed vertices.

5. The method of claim 4, wherein the geometry processing unit is configured to execute microcode derived from geometry shader program written in assembly code or to execute microcode derived from a geometry shader program written in a high-level shading language.

6. The method of claim 1, wherein the one or more attributes of the transformed vertices written to the transform feedback buffer can be subsequently processed in the graphics rendering pipeline without any intervention by a central processing unit.

7. The method of claim 1, wherein at least two attributes of the transformed vertices are written to the transform feedback buffer and are stored in an interleaved fashion.

8. The method of claim 1, wherein the step of selecting comprises selecting a first attribute of the transformed vertices to store in the transform feedback buffer, and the step of configuring comprises configuring the transform feedback buffer to store the first attribute of the transformed vertices, and further comprising the steps of allocating memory space in the memory for a second transform feedback buffer, selecting a second attribute of the transformed vertices to store in the second transform feedback buffer, and configuring the second transform feedback buffer to store the second attribute of the transformed vertices, and wherein the first processing mode, once initiated, results in the first attribute of the transformed vertices being written to the transform feedback buffer and the second attribute of the transformed vertices being written to the second transform feedback buffer.

9. The method of claim 1, wherein the second processing mode comprises a rasterizer discard mode and the second processing unit comprises a fragment processing unit.

10. A computing device configured to store attributes of vertices transformed in a graphics rendering pipeline, the computing device comprising:
    a graphics processing unit that includes the graphics rendering pipeline; and
    a software driver configured to:
        allocate memory space in a memory for a transform feedback buffer;
        select one or more attributes of the transformed vertices to store in the transform feedback buffer independently of any shader programs executing on any processing units in the graphics rendering pipeline;

configure the transform feedback buffer to store the one or more attributes of the transformed vertices that are modified without loading a new shader program onto the graphics rendering pipeline;

initiate a first processing mode wherein vertex data is processed by a processing unit in the graphics rendering pipeline to produce the transformed vertices, and the one or more attributes of the transformed vertices are then written to the transform feedback buffer; and after the one or more attributes are written to the transform feedback buffer, determine whether a second processing mode is enabled, wherein the transformed vertices are discarded from the graphics rendering pipeline when the second processing mode is enabled, or the transformed vertices are transmitted to a second processing unit in the graphics processing pipeline when the second processing mode is not enabled.

11. The computing device of claim 10, wherein the graphics rendering pipeline includes a vertex processing unit that produces the transformed vertices.

12. The computing device of claim 11, wherein the vertex processing unit is configured to perform fixed-function vertex processing, to execute microcode derived from a vertex shader program written in assembly code, or to execute microcode derived from a vertex shader program written in a high-level shading language.

13. The computing device of claim 10, wherein the graphics rendering pipeline includes a geometry processing unit that produces the transformed vertices.

14. The computing device of claim 13, wherein the geometry processing unit is configured to execute microcode derived from geometry shader program written in assembly code or to execute microcode derived from a geometry shader program written in a high-level shading language.

15. The computing device of claim 10, further comprising a central processing unit, and wherein the one or more attributes of the transformed vertices written to the transform feedback buffer can be subsequently processed in the graphics rendering pipeline without any intervention by the central processing unit.

16. The computing device of claim 10, wherein at least two attributes of the transformed vertices are written to the transform feedback buffer and are stored in an interleaved fashion.

17. The computing device of claim 10, wherein the software driver is configured to select a first attribute of the transformed vertices to store in the transform feedback buffer and to configure the transform feedback buffer to store the first attribute of the transformed vertices, and the software driver is further configured to allocate memory space in the memory for a second transform feedback buffer, to select a second attribute of the transformed vertices to store in the second transform feedback buffer, and to configure the second transform feedback buffer to store the second attribute of the transformed vertices, and wherein the first processing mode, once initiated, results in the first attribute of the transformed vertices being written to the transform feedback buffer and the second attribute of the transformed vertices being written to the second transform feedback buffer.

18. The computing device of claim 10, wherein the plurality of instructions are based on the OpenGL™ graphics API.

19. The computing device of claim 10, wherein the memory is a memory local to the graphics processing unit.

20. The computing device of claim 10, wherein the second processing mode comprises a rasterizer discard mode and the second processing unit comprises a fragment processing unit.

21. A non-transitory computer-readable medium including a plurality of instructions that when executed by a processor causes a computing device to store attributes of vertices transformed in a graphics rendering pipeline, by performing the steps of:

allocating memory space in a memory for a transform feedback buffer;

selecting one or more attributes of the transformed vertices to store in the transform feedback buffer independently of any shader programs executing on any processing units in the graphics rendering pipeline;

configuring the transform feedback buffer to store the one or more attributes of the transformed vertices that are modified without loading a new shader program onto the graphics rendering pipeline;

initiating a first processing mode wherein vertex data is processed by a processing unit in the graphics rendering pipeline to produce the transformed vertices, and the one or more attributes of the transformed vertices are then written to the transform feedback buffer; and after the one or more attributes are written to the transform feedback buffer, determining whether a second processing mode is enabled, wherein the transformed vertices are discarded from the graphics rendering pipeline when the second processing mode is enabled, or the transformed vertices are transmitted to a second processing unit in the graphics processing pipeline when the second processing mode is not enabled.

22. The computer-readable medium of claim 21, wherein the plurality of instructions are based on the OpenGL™ graphics API.

23. The computer-readable medium of claim 21, wherein the second processing mode comprises a rasterizer discard mode and the second processing unit comprises a fragment processing unit.

* * * * *